United States Patent [19]

Morgenstern

[11] Patent Number: 5,740,984

[45] Date of Patent: Apr. 21, 1998

[54] LOW SONIC BOOM SHOCK CONTROL/ ALLEVIATION SURFACE

[75] Inventor: John M Morgenstern, Huntington Beach, Calif.

[73] Assignee: McDonnell Douglas Corporation, Saint Louis, Mo.

[21] Appl. No.: 310,495

[22] Filed: Sep. 22, 1994

[51] Int. Cl.[6] .................................................. B46C 30/00
[52] U.S. Cl. ...................... 244/1 N; 244/75 R; 244/45 A
[58] Field of Search .................................. 244/1 N, 25 R, 244/45 A, 45 R, 13, 55

[56] References Cited

U.S. PATENT DOCUMENTS

| | | | |
|---|---|---|---|
| 2,944,765 | 7/1960 | Lane et al. | 244/15 |
| 2,980,370 | 4/1961 | Takacs . | |
| 2,986,370 | 9/1961 | Takacs | 244/1 N |
| 3,152,775 | 10/1964 | Boyd | 244/1 N |
| 3,161,379 | 12/1964 | Lane | 244/53 B |
| 3,240,447 | 3/1966 | Olshausen | 244/76 R |
| 3,425,650 | 2/1969 | Silva | 244/1 N |
| 3,478,989 | 11/1969 | Bielefeldt | 244/120 |
| 3,497,163 | 2/1970 | Wakefield | 244/1 N |
| 4,008,867 | 2/1977 | Kaniut . | |
| 4,691,879 | 9/1987 | Greene | 244/45 A |

OTHER PUBLICATIONS

A.R. George and R. Seebass; *Sonic Boom Minimization Including Both Front and Rear Shocks*, pp. 2091–2093, vol. 9, No. 10, AIAA Journal, Oct. 1971.

A.R. Seebass and A.R. George; *Design and Operation of Aircraft to Minimize Their Sonic Boom*, presented at Paper 73–241 at the AIAA 11th Aerospace Sciences Meeting, Washington, DC, Jan. 10–12, 1974.

R. Seebass and A.R. George; *Sonic-Boom Minimization*, The Journal of Acoustical Society of America, pp. 668–693, vol. 51, No. 2 (Part 3), 1972.

*Primary Examiner*—Galen L. Barefoot
*Attorney, Agent, or Firm*—Bell, Seltzer, Park & Gibson, P.A.

[57] ABSTRACT

A sonic control device that reduces the effects of shock waves generated by an aircraft traveling at supersonic speeds. The control device includes a control surface located at or near the nose section of the aircraft. The position of the control surface can be moved between a retracted position and an extended position. When in a deflected position, the control surface increases the air pressure at the nose section. The increase in air pressure at the nose section decreases both the pressure amplitude and the slope of the overall shock wave as the wave travels toward the ground. Additionally, the deflection of the control surface may induce a downward directed pressure increase which creates less of a drag penalty than a truly blunt nose. When shock control is not desired, the control surface is moved back to the retracted position to reduce the drag on the plane. The moving control device allows a supersonic aircraft to efficiently travel above both land and water.

14 Claims, 3 Drawing Sheets

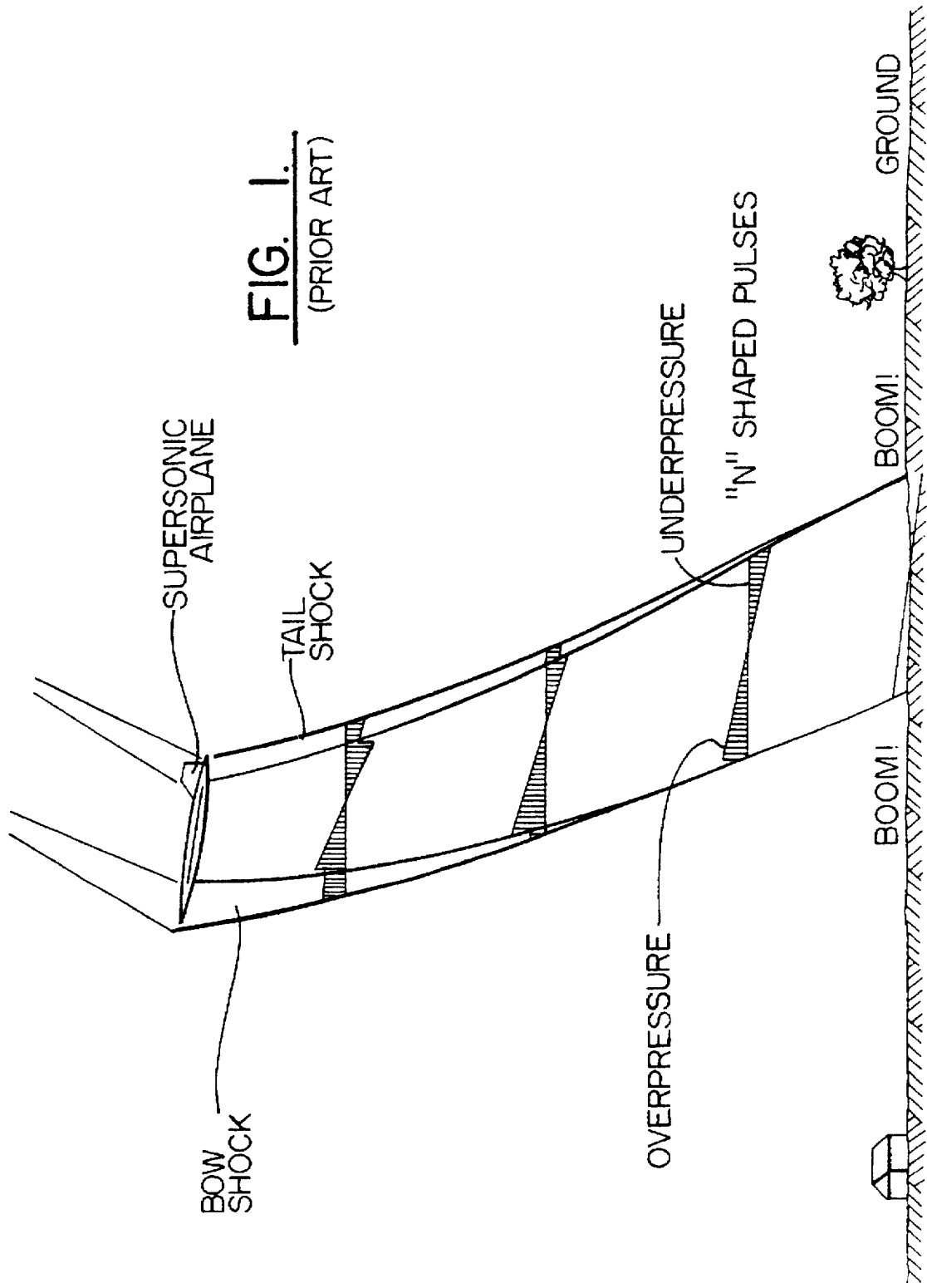

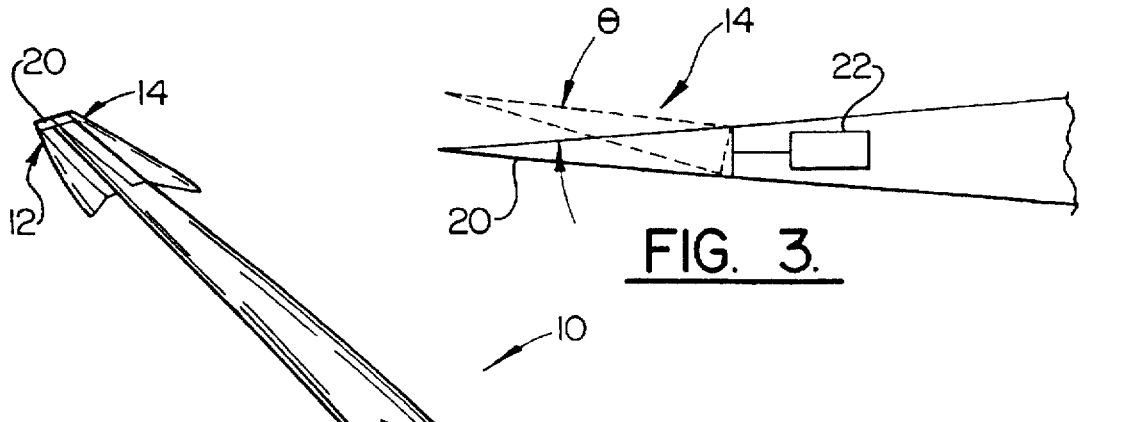
FIG. 3.
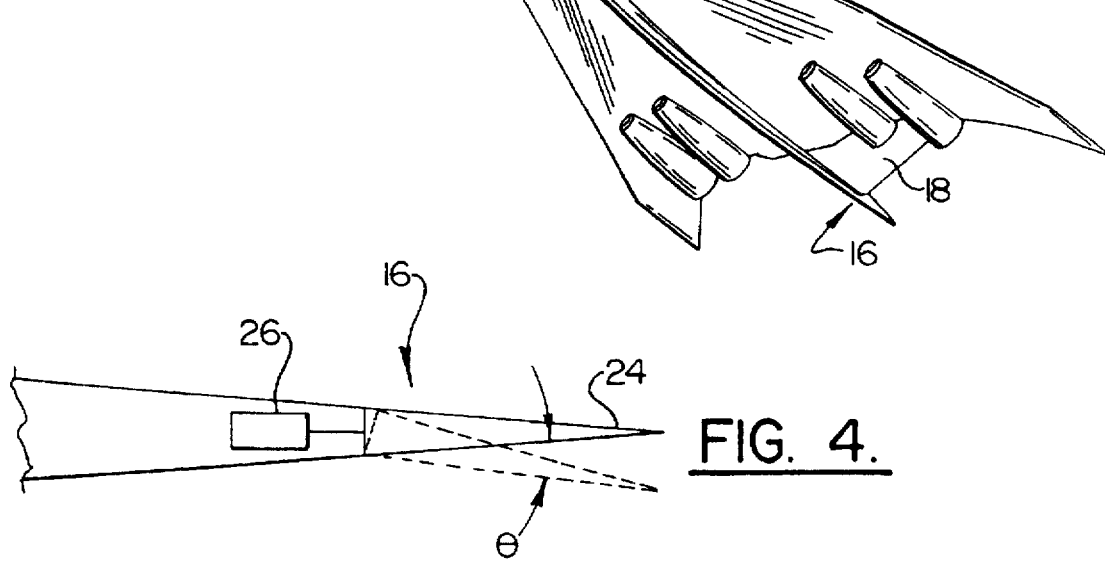
FIG. 2.
FIG. 4.
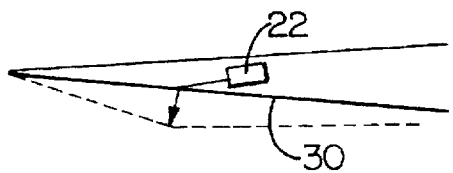
FIG. 5.

LOW SONIC BOOM SHOCK CONTROL/ALLEVIATION SURFACE

The invention described herein was made in the performance of work under NASA Contract No. NAS1-19345 and is subject to the provisions of Section 305 of the National Aeronautics and Space Act of 1958 (42 U.S.C. 2457.

BACKGROUND OF THE INVENTION

1. Field of the Invention

The present invention relates to a control device that reduces the effects of the sonic boom created by an aircraft traveling at supersonic speeds.

2. Description of Related Art

When an object such as an airplane travels through air, the movement of the plane causes a pressure disturbance that moves at the speed of sound. By way of example, the sound waves created by the nose of the plane will travel in an outward direction away from the aircraft. The air ahead of the plane receives the sound waves before the arrival of the aircraft, so that when the aircraft arrives, the air flows around the plane. As the airplane approaches the speed of sound, the sound waves merge closer and closer together at the front of the plane. When the aircraft is moving at the speed of sound the sound waves merge together into a "shock wave" which is an almost instantaneous line of change in pressure, temperature and density.

As shown in FIG. 1, an aircraft traveling at supersonic speed will generate a bow shock wave from the nose of the airplane and a tail shock wave created by the tail of the plane. The tail shock wave is created by an under pressurization in the air about the tail. The overall shock wave is represented by a N shaped pressure gradient that extends from an over pressure area beneath the fore portion of the plane and an under pressure area beneath the aft section of the aircraft.

The shock waves travel through the atmosphere to the ground. To an observer, the shock waves are felt as an abrupt pressure compression followed by a rapid pressure decompression. The abrupt change in pressure can create a relatively loud sound that is annoying to the citizenry. Additionally, the shock waves may cause structural damage to surrounding buildings. For these reasons supersonic transports (SST) have been limited to routes that do not carry the plane across land. SSTs are therefore restricted to flights across water, thereby limiting the usefulness of the planes. It is desirable to reduce the effects of sonic shock waves created by supersonic aircraft.

In the publication by A. R. Seebass et al., "DESIGN AND OPERATION OF AIRCRAFT TO MINIMIZE THEIR SONIC BOOM", AIAA Aerospace Sciences Meeting, Wash. D.C., Jan. 10–12, 1924, the authors suggested that the effects of shock waves could be reduced by blunting the nose of the aircraft. A blunt nose will increase the air pressure immediately adjacent to the nose of the plane. The high pressure pulse at the nose section will cause the overall pressure wave to "flatten out", thereby decreasing both the slope and the amplitude of the pressure wave as the wave strikes the ground. Although effective in reducing the abrupt pressure changes in the shock wave, blunting the nose of an aircraft can cause a severe wave drag penalty. This drag penalty is particularly undesirable when flying over water, where the sonic boom of the shock waves may not create an undesirable effect. It is therefore desirable to provide an aircraft which will control the effects of shock waves when flying over land and eliminate or minimize a drag penalty when flying over water.

SUMMARY OF THE INVENTION

The present invention is a sonic control device that reduces the effects of shock waves generated by an aircraft traveling at supersonic speeds. The control device includes a control surface located at or near the nose section of the aircraft. The position of the control surface can be moved between a retracted position and an extended position. When in the extended position, the control surface increases the air pressure at the nose section. The increase in air pressure at the nose section decreases both the pressure amplitude and the slope of the overall shock wave as the wave travels toward the ground. Additionally, the deflection of the control surface may induce a downward directed pressure increase which creates less of a drag penalty than a truly blunt nose. When shock control is not desired, the control surface is moved back to the retracted position to reduce the drag on the plane. The moving control device allows a supersonic aircraft to efficiently travel above both land and water.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is an illustration of an aircraft that travels faster than the speed of sound and creates shock waves that strike the ground;

FIG. 2 is a perspective view of an aircraft with a sonic control device of the present invention;

FIG. 3 is an enlarged view of a nose section of the aircraft with a moving control surface;

FIG. 4 is an enlarged view of a control surface located at the aft section of the aircraft;

FIG. 5 is a view similar to FIG. 3 showing an alternate embodiment of the invention;

DETAILED DESCRIPTION OF THE INVENTION

Figure 6A:
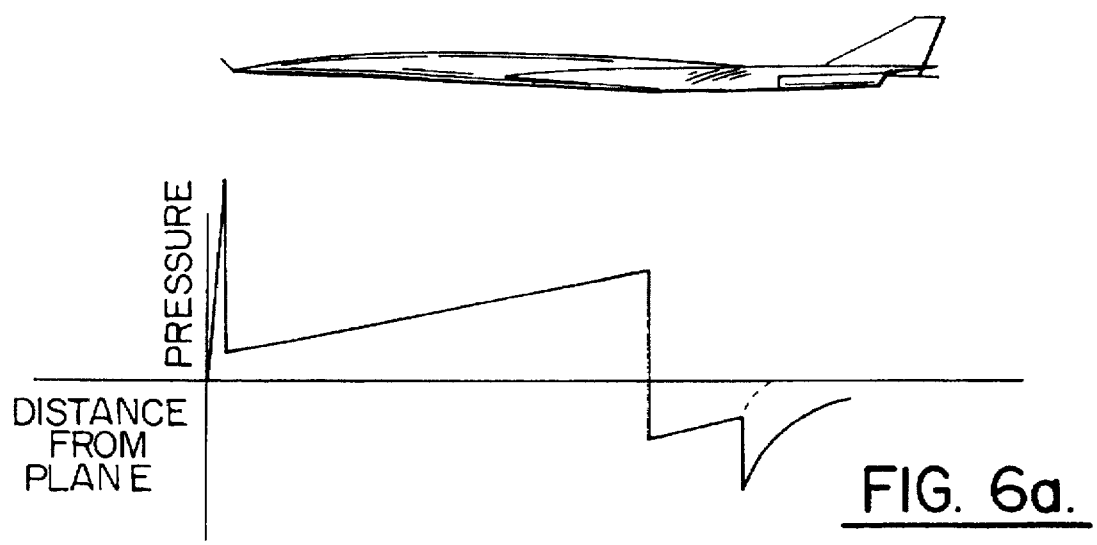
FIGS. 6a–d show the pressure wave created by the sonic control device of the present invention as the wave travels to the ground.

Referring to the drawings more particularly by reference numbers, FIG. 2 is an aircraft 10 of the present invention. The aircraft 10 a fore section 12 with a nose 14 and an opposite aft section 16 with a tail 18. The aircraft 10 is capable of flying at speeds approximately equal to or greater than the speed of sound, wherein the plane 10 can fly at transonic or supersonic speeds as those terms are understood in the art.

As shown in FIG. 3, a first control surface 20 is located at the nose 14 of the aircraft 10. The first control surface 20 is coupled to a movement device 22 which can move the control surface 20 between a first position and a second position. The first position is typically a zero angle (θ=0) position and the second position is a maximum deflection position. By way of example, the movement device 22 may be an electric or hydraulic actuator which moves the control surface 20 between the two positions shown, upon input commands from the pilot of the aircraft 10.

The first control surface 20 may be a simple plate, or any lift or volume control device, that increases the air pressure at the nose section 14 when the surface 20 is moved to the second position, thereby effectively creating a blunt nose. Moving the first control surface 20 to the second position creates a corresponding lift and resultant drag. The first control surface 20 is utilized to control the shock wave created by the nose the aircraft 10, when the plane is traveling at transonic or supersonic speeds. When a blunt nose is no longer desired, the control surface 20 can be moved back to the first position, which reduces the lift and the drag created by the surface 20. In the preferred embodiment, the control surface is rotated approximately 3° (0.06 rad).

As shown in FIG. 4, the aircraft 10 may also have a second control surface 24 located at the aft section 16 of the plane. The second control surface 24 is coupled to a second movement device 26 that can move the second control surface 24 between a first position and a second position. The second control surface is utilized to control the shock wave created by an aircraft traveling at transonic or supersonic speeds. The second control surface 24 can be used as an alternative to, or in conjunction with the first control surface 20. When used with the first control surface 20, the second control surface 24 is typically moved in synchronization with the first control surface 20, wherein the second surface 26 is in the first position when the first surface 20 is in the first position, and the second surface 26 is in the second position when the first surface 20 is in the second position.

FIG. 5 shows another embodiment with a volume control surface 30 that moves between an extended and retracted position. The control surface 30 increases the volume of the nose 14 and creates a high pressure spike at the nose area of the plane. In general, the present invention encompasses any control surface that is extended and retracted, and creates a high pressure area at the nose 14 of the plane.

Figure 6B:
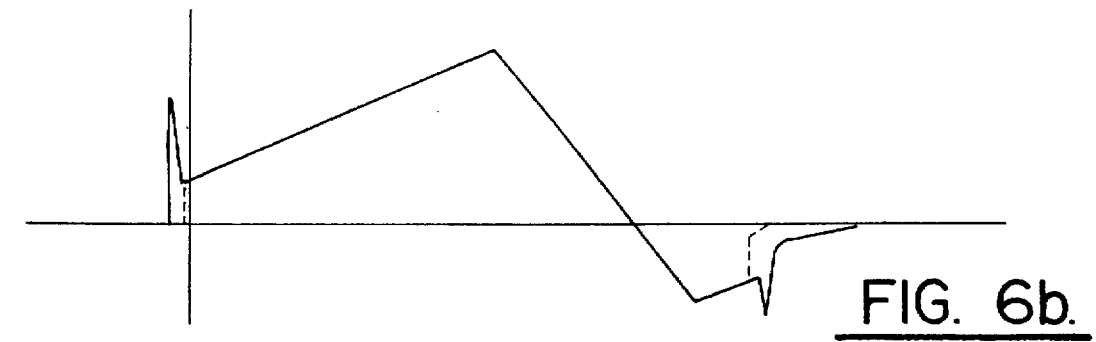
Figure 6C:
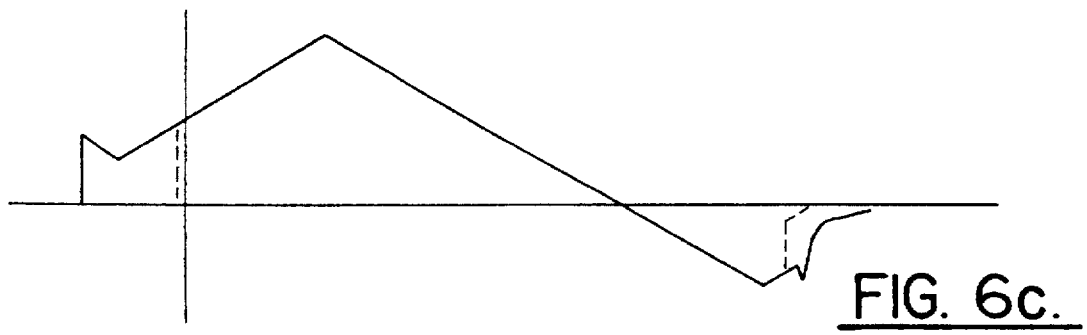
Figure 6D:
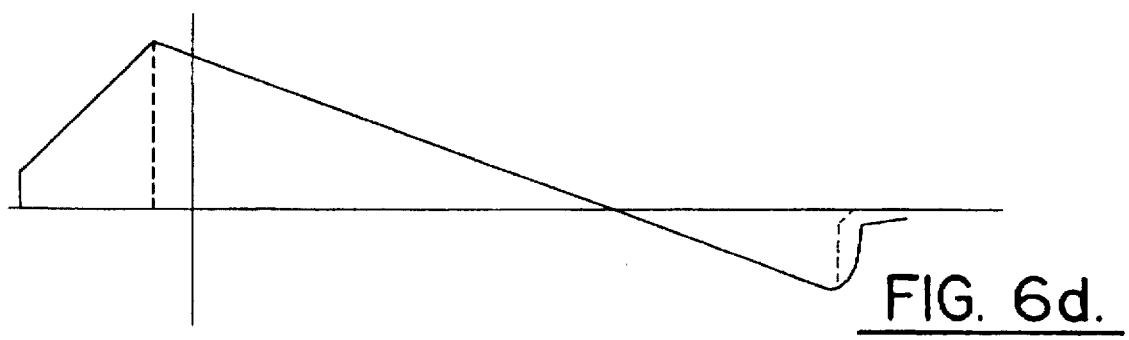

FIGS. 6a–d show the overall pressure wave created by an aircraft 10 flying at supersonic speeds with the first control surface 20 in the second position. As shown in FIG. 6a, the control surface 20 initially creates a high pressure spike at the nose 14 of the plane. Without limiting the scope of the invention, it is believed that the high pressure spike creates a corresponding rise in temperature which increases the velocity of the sound wave. The increase in sound velocity stretches out the high pressure sound wave. As shown in FIGS. 6b–d, the resultant pressure wave has a lower slope and amplitude when the wave strikes the ground. The decrease in slope and amplitude of the pressure wave reduces the abrupt pressure changes as the wave strikes the ground, thereby reducing the undesirable effects of the sonic boom.

In operation, when the aircraft 10 is traveling at transonic or supersonic speeds above land, the control surfaces 20 and/or 26 are moved to the second positions to reduce the effects of the shock wave as the wave strikes the ground. When the aircraft flies over an area of water, the control surfaces 20 and/or 26 are moved to the first positions to reduce the drag of the control surfaces. What is thus provided is a shock control system that can reduce the effects of shock when a supersonic aircraft is flying over land and eliminate or minimize the drag penalty of the system when the plane is flown over water.

Although movement of the control surfaces 20 and 26 are described and shown as moving from a zero angle first position to a maximum deflection second position, it is to be understood that the control surfaces can be moved to any position between the zero angle and maximum deflection positions. Varying the deflection of the control surfaces can adjust the amplitude of the nose and/or tail shock to account for different vehicle operating conditions (e.g. mach, altitude, angle of attack, etc.), and different atmospheric conditions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A sonic control device that selectively reduces a sonic boom of an aircraft, comprising:
   an aircraft that has a fore section and an aft section, said aircraft having a nose section at said fore section;
   a first control surface located at said nose section of said fore section of said aircraft;
   a first movement device that rotates said first control surface between a first position and a more upwardly inclined second position for flying over populated areas, wherein said first control surface provides a blunt nose to increase pressure at said nose section when rotated from the first position to the second position so that there is a positive pressure profile along said entire nose section and reduce the effects of the sonic boom created by said aircraft, wherein said first control surface provides a non-blunt and less inclined tapered nose profile when in the first position for flying over less populated areas.

2. The control device as recited in claim 1, further comprising a second control surface located at said aft section of said forebody and a second movement device that moves said second control surface between a first position and a second position; wherein said second control surface decreases pressure at said aft section when rotated from the first position to the second position and reduces the effects of the sonic boom of the aircraft.

3. The control device as recited in claim 1, wherein said first control surface is rotated approximately 3°.

4. The control device as recited in claim 1, wherein said first movement device moves said first control surface to an intermediate position between the first and second positions.

5. The control device as recited in claim 1, wherein said control surface increases a volume of said fore section.

6. A method for selectively decreasing the effects of a sonic boom of an aircraft, comprising the steps of:
   a) flying an aircraft at a supersonic speed, said aircraft having an aft section and a fore section, said aircraft having a nose section at said fore section;
   b) rotating a first control surface located at said nose section of said aircraft from a first position to a more upwardly inclined second position for flying over populated areas to provide a blunt nose and to increase pressure at said nose section so that there is a positive pressure profile along said entire nose section and reduce the effects of the sonic boom created by said aircraft;
   c) rotating said first control surface to the first position for flying over less populated areas to provide a non-blunt and less inclined tapered nose profile.

7. The method as recited in claim 6, further comprising the step of moving a second control surface located at said aft section of said aircraft to increase pressure at said aft section and reduce the effects of the sonic boom created by said aircraft.

8. The method as recited in claim 7, wherein said first and second control surfaces are rotated from a first position to a second position.

9. The method as recited in claim 6, wherein said first control surface increases a volume of said fore section.

10. A sonic control device that selectively reduces a sonic boom of an aircraft, comprising:

an aircraft that has a fore section and an aft section and defines a central longitudinal axis, said aircraft having a nose section at said fore section;

a first control surface located at said nose section of said fore section of said aircraft, said first control surface having a leading edge which is perpendicular to the central longitudinal axis of said aircraft;

a first movement device that rotates said first control surface between a first position and a second position, wherein said first control surface provides a blunt nose to increase pressure at said nose section when rotated from the first position to the second position so that there is a positive pressure profile along said entire nose section and to reduce the effects of the sonic boom created by said aircraft, wherein said first control surface provides a non-blunt tapered nose profile when in the first position.

11. The control device as recited in claim 10, wherein said leading edge of said first control surface extends in a transverse direction across a vertical plane which includes the central longitudinal axis of the aircraft.

12. The control device as recited in claim 10, wherein said second position of said first control surface is more upwardly inclined than said first position for reducing the sonic boom over populated areas.

13. The control device as recited in claim 10, further comprising a second control surface located at said aft section of said forebody and a second movement device that moves said second control surface between a first position and a second position, wherein said second control surface decreases pressure at said aft section when rotated from the first position to the second position and reduces the effects of the sonic boom of the aircraft.

14. The control device as recited in claim 10, wherein said control surface increases a volume of said fore section.

* * * * *